United States Patent
Barron et al.

(10) Patent No.: US 6,502,203 B2
(45) Date of Patent: *Dec. 31, 2002

(54) METHOD AND APPARATUS FOR CLUSTER SYSTEM OPERATION

(75) Inventors: Dwight L. Barron, Houston, TX (US); Michael F. Angelo, Houston, TX (US)

(73) Assignee: Compaq Information Technologies Group, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/293,587

(22) Filed: Apr. 16, 1999

(65) Prior Publication Data

US 2002/0152414 A1 Oct. 17, 2002

(51) Int. Cl.$^7$ .............................. H02H 3/05; H04L 1/22
(52) U.S. Cl. ..................... 714/4; 709/250; 340/310.01; 370/225
(58) Field of Search ............................ 714/4; 370/223, 370/236, 217, 225, 419; 375/220; 340/310.01, 288; 709/250

(56) References Cited

U.S. PATENT DOCUMENTS

| | | | | |
|---|---|---|---|---|
| 3,911,415 A | * | 10/1975 | Whyte | ......................... 340/10.1 |
| 4,300,126 A | * | 11/1981 | Gajjar | ..................... 340/310.04 |
| 4,792,731 A | | 12/1988 | Pearlman et al. | |
| 4,912,723 A | * | 3/1990 | Verbanets, Jr. | ........... 340/825.51 |
| 4,926,415 A | * | 5/1990 | Tawara et al. | |
| 5,059,871 A | | 10/1991 | Pearlman et al. | |
| 5,144,666 A | | 9/1992 | Le Van Suu | |
| 5,301,311 A | * | 4/1994 | Fushimi et al. | ................ 714/23 |
| 5,313,584 A | * | 5/1994 | Tickner et al. | |
| 5,352,957 A | | 10/1994 | Werner | |
| 5,382,951 A | | 1/1995 | White et al. | |
| 5,453,738 A | | 9/1995 | Zirkl et al. | |
| 5,588,002 A | * | 12/1996 | Kawanishi et al. | |
| 5,608,446 A | * | 3/1997 | Carr et al. | |
| 5,673,384 A | * | 9/1997 | Hepner et al. | |
| 5,805,926 A | | 9/1998 | Le Van Suu | |
| 5,857,087 A | * | 1/1999 | Bemanian et al. | |
| 5,859,596 A | * | 1/1999 | McRae | ......................... 324/424 |
| 5,999,712 A | * | 12/1999 | Moiin et al. | |
| 6,173,318 B1 | * | 1/2001 | Jackson et al. | .............. 709/203 |
| 6,192,401 B1 | * | 2/2001 | Modiri et al. | |
| 6,202,080 B1 | * | 3/2001 | Lu et al. | |
| 6,272,551 B1 | * | 8/2001 | Martin et al. | ................ 370/419 |
| 6,279,032 B1 | * | 8/2001 | Short et al. | ................. 709/208 |
| 6,324,161 B1 | * | 11/2001 | Kirch | .......................... 370/217 |

OTHER PUBLICATIONS

Neuron Chip Local Operating Network LSls, 1998 pp. 1–20.*
X–10 Powerhouse.*
Siec LON (Local Operating Network) firmy Echelon, 1995 pp. 1–22.*
"Sun™ Clusters", A White Paper, from www.sun.com/clusters/, Oct. 1997, 26 pages.
"Architecture Cluster Workshop", www.sei.cmu.edu/community/edcs. Oct. 1996, 11 pages.
"High–Performance Networks, Clusters, and Interoperability", www.hcs.ufl.edu, 3 pages.

* cited by examiner

Primary Examiner—Paul R. Myers
(74) Attorney, Agent, or Firm—Conley, Rose & Tayon, P.C.

(57) ABSTRACT

A method and system of quorum negotiation utilizing power mains. Unlike current systems, this communication is provided as a secondary channel, with the primary channel being a standard network system. By using this technique, if the heartbeat is lost over the primary communication system, the secondary, power-mains system can be used to check the heartbeat to validate whether or not the "lost" system is still in operation. If communication cannot be established over the power mains, it is assumed that the "lost" system is down and should be dropped from any cluster.

32 Claims, 2 Drawing Sheets

METHOD AND APPARATUS FOR CLUSTER SYSTEM OPERATION

FIELD OF THE INVENTION

The present invention relates to clusters of computers, and particularly to data communication between computers in a cluster system.

BACKGROUND AND SUMMARY OF THE INVENTION

A "cluster" is a collection of computers that work in concert to provide a much more powerful system. (More precisely, a cluster can be defined as a set of loosely coupled, independent computer nodes, which presents a single system image to its clients.) Clusters have the advantage that they can grow much larger than the largest single node, they can tolerate node failures and continue to offer service, and they can be built from inexpensive components. The nodes of the cluster may communicate over network interconnects which are also used to let the cluster communicate with other computers, or the cluster architecture may include a dedicated network which is only used by the nodes of the cluster. As the price of microprocessors has declined, cluster systems based on personal computers have become more attractive. The present application discloses a new cluster architecture.

Background: Particular Problems in Cluster Systems

A key necessity in cluster operations is to coordinate the operation of the members of the cluster. One very fundamental element of this is that each member of a cluster needs to know whether the cluster is still operating, and if so who the other members of the cluster are. This basic need is referred to as "quorum validation."

A current method for quorum validation, i.e. the process of verifying that the cluster members are still present, is to send messages (called "heartbeats") to other nodes to obtain mutual consent on the agreed upon list of cluster members. These heartbeats include both substantive messages sent by a node, and other messages which simply indicate that the sending node is still connected to the network and functioning correctly. Loss of messaging capability between any nodes (or groups of nodes) in a cluster can be detected by the loss of heartbeats from a given node. When such a loss of messaging occurs, the remaining cluster nodes will attempt to create a new member list of the cluster. This activity is called quorum negotiation.

This capability makes the cluster organization robust. However, this can lead to a particularly acute problem. In some cases loss of messaging can result in multiple partitioned subclusters which all agree on subsets of membership, and which form multiple, partitioned clusters independently operating on, modifying, or creating data intended to be part of a larger data set common to the whole cluster. This is often referred to as the "split brain syndrome," in that the cluster splits into two disjoint parts that both claim to own some system resource. Eventual rejoining of the independent partitioned clusters into one large cluster will cause the datasets to be re-synchronized, often requiring one or more sets of modified data to be discarded, resulting in a loss of data integrity and a waste of processing cycles. Other details of cluster systems may be found in many publications, including The Design and Architecture of the Microsoft Cluster Service, Proceedings of the FTCS 1998, which is hereby incorporated by reference.

Method and Apparatus for Cluster System Operation

The present application discloses a cluster system and a method of quorum negotiation, utilizing communication over a power mains to provide a secondary communication channel. This secondary channel does not replace the primary channel, which is still a standard or high-speed network system. If the heartbeat is lost over the primary communication system, the secondary channel can be used to check the heartbeat to validate whether or not the "lost" system is still in operation. If communication cannot be established over the power mains, it is assumed that the "lost" system is down and should be dropped from any cluster.

In addition, this methodology can be used to reset components or nodes, and to guarantee that the split system is reset. This technique also overcomes the problem of determining whether the entire cluster or just member systems should be reset.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

This application shares some text and figures with the following applications, all owned in common with and having effective filing dates identical to that of the present application, and each hereby incorporated by reference: application Ser. No. 09/280,313, application Ser. No. 09/280,314, and application Ser. No. 09/280,211.

Definitions:

Following are short definitions of the usual meanings of some of the technical terms which are used in the present application. (However, those of ordinary skill will recognize whether the context requires a different meaning.) Additional definitions can be found in the standard technical dictionaries and journals.

Cluster refers to a group of independent systems working together as a single system.

Node generally refers to a system in a cluster, but may also refer to another standalone unit configured to communicate with cluster members, but not to share cluster processing, such as a smart UPS.

Interconnect refers to a communication link used for intra-cluster status info such as heartbeats. This can be a typical Ethernet system, and in the preferred embodiment, the power mains are used as a backup interconnect.

IPMI or Intelligent Platform Management Interface is a specification that was introduced as a standard interface to hardware used for monitoring a server's physical characteristics, such as temperature, voltage, fans, power supplies and chassis. The IPMI specification defines a common interface and message-based protocol for accessing platform management hardware.

CEBus or Consumer Electronic Bus is an industry standard for home automation that describes a local communications and control network designed specifically for the home. Like X10, the CEBus standard provides a standardized communication facility for exchange of control information and data among various devices and services in the home. The CEBus standard generally has a wide bandwidth, e.g., 100–400 KHz, for communicating data at a relatively fast speed, i.e., 10 Kilobits/second and is significantly faster and more reliable than the X10 protocol. The CEBus standard encompasses both the physical media (wires, fiber, etc.) and the protocol (software) used to create an intelligent home or office.

Figure 1:
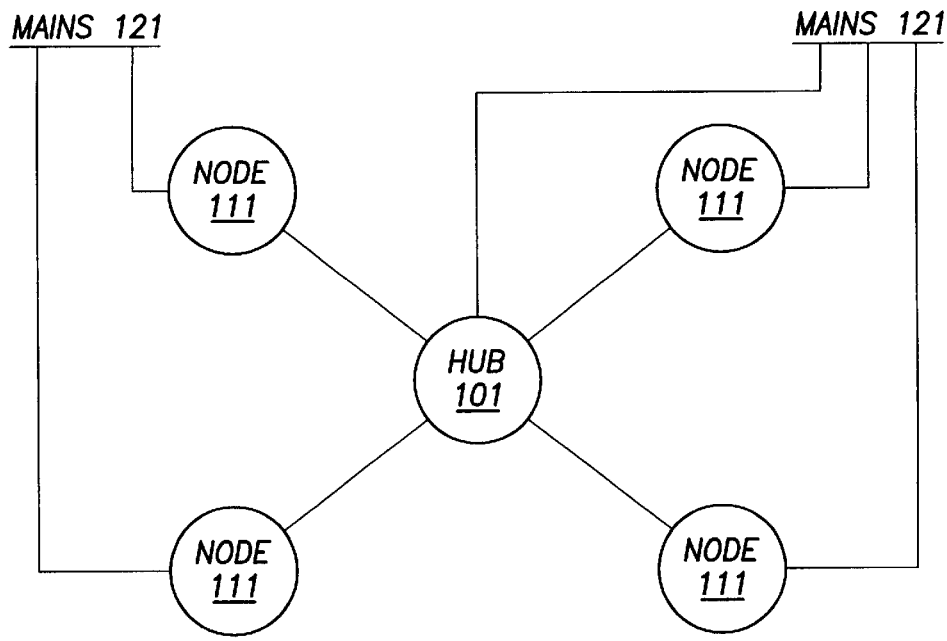
FIG. 1 shows a block diagram of a computer system network according to the presently preferred embodiment.

According to the most preferred class of embodiments, a cluster of computer systems is provided in which various "smart" devices within each individual computer system are also capable of communicating with each other over the system power rail, and between devices on different computer systems over a common power main. FIG. 1 shows a block diagram of such a cluster. However, it must be understood that the use of intrachassis power-rail communication is NOT necessary to the claimed cluster architecture.

In FIG. 1, hub 101 communicates with a plurality of nodes 111. Hub 101, and each node 111, is preferably a complete PC computer system (though possibly lacking a display and/or key-board). The hub, and each of the nodes, is connected to power mains 121. This is an electrically common connection, i.e. there is no transformer isolation between the outlets into which the different units are plugged. If Uninterruptable Power Supplies ("UPSs") are used, this may require a bridging to transmit AC signals around the UPSs.

Description of Exemplary Node

Figure 2:
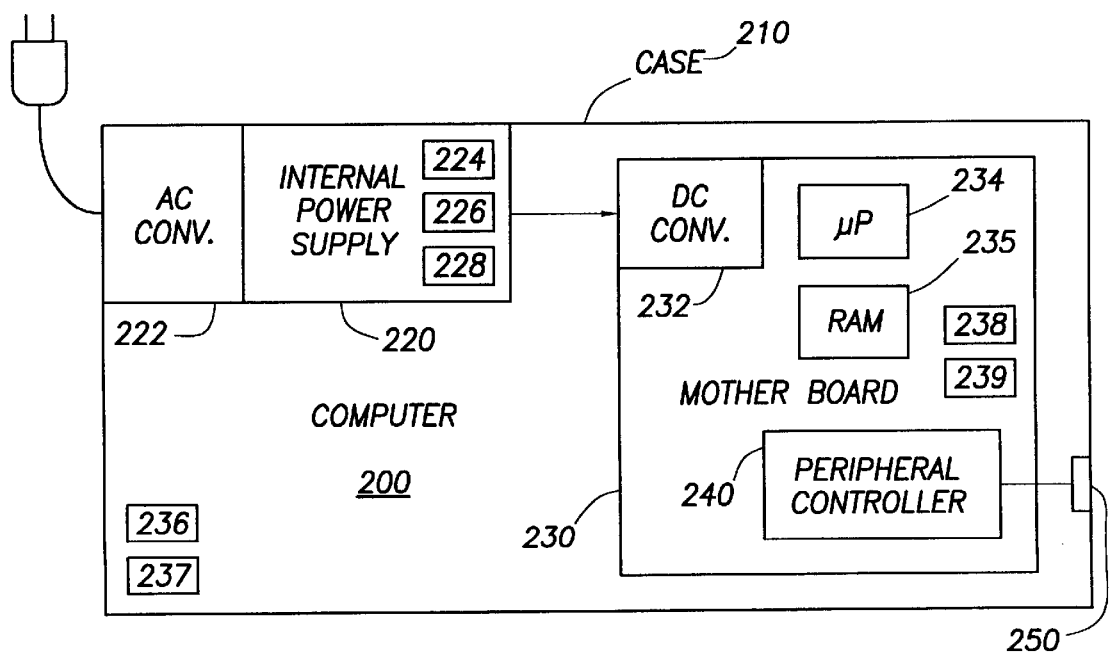
FIG. 2 shows a sample electrical configuration of some important parts of a computer according to the preferred embodiment.

FIG. 2 shows a sample electrical configuration of some important parts of a computer 200. The case 210 encloses the motherboard 230 and power supply 220, as well as other components, such as a hard disk drive 236 and a removable media drive 237, and may enclose many other possible components, not shown, such as an I/O channel interfaces, and option cards. The motherboard 230 includes many key components of the computer. For example, the motherboard carries one or more microprocessors (or other processing units) 234, RAM 235, and a peripheral controller 240, as well as many other components which are not shown. Also mounted on the mother board may be a temperature sensor 238 or exhaust fan 239.

The power supply 220 preferably includes an AC connection 222, which permits power to be drawn from an AC power mains, and provides power to a DC connector 232 on the motherboard. Further, the power supply preferably includes a cooling device 224 and a temperature sensor 226.

According to the preferred embodiment, the power supply incorporates a microcontroller 228, which is connected to the system power rail, and is capable of communicating with other devices over the power rail. Other devices will also incorporate a similar microcontroller, not shown, for communicating with the power supply and other components over the power rail. According to the preferred embodiment, this communication is done according to the CEBus specification, described above. Because the particular requirements of the system components may differ, the CEBus standard may be modified, e.g., by voltage scaling, to allow the disclosed communications to occur without interfering with system function.

The exemplary functions below will be described with particular reference to the microcontroller 228 of the power supply, but it will be understood by those skilled in the art that the similar controllers in other system devices will function and communicate similarly. Moreover, when reference is made to any specific component communicating with another over the power rail, it will be understood that this is accomplished by use of the respective microcontrollers of those components.

In this embodiment, various system devices, including the temperature sensor 238, the exhaust fan 239, and the hard disk drive 236, are connected to send and receive signals over the power rail. In this manner, the controller 228 in the power supply can communicate with these system devices. Further, the system peripheral controller can be connected to communicate over the power rail.

Particular communications supported by the controller 228 include the ability to request basic status information from each device, and to command the devices to power on or off as needed. For example, the controller 228 may receive information from temperature sensor 238 indicating a high temperature, and may command exhaust fan 239 to turn on in response.

Further, each system device has an associated identifier address which uniquely identifies that device within the system. The identifier functions to specifically identify both the type of device and the specific address of that device within devices of that type. This identifier is used to specifically identify the sender and recipient of any data or command sent over the system power rail.

This identifier is particularly advantageous when used to determine which device types are authorized to perform certain functions or to send certain commands. For example, while it may be useful for a temperature sensor, upon detection of an overheating condition, to order the power supply to shut the system down, there is almost no reason for a hard disk drive to request a system shut-down. By identifying the class of device from which a command is sent, the receiver can determine whether or not to respond.

Another particularly useful function of the preferred embodiment is the ability to perform a "roll call" enumeration of the devices present on the system bus. This function is performed by the controller 228 sending out a command requesting that all devices identify themselves. In response, each device responds with an acknowledge signal which includes its identifier. This process allows the controller 228 to keep an inventory of active devices, and herefore which devices it is able to control. Once a roll-call has been taken, the controller is able to identify malfunctioning devices by noting which devices fail to respond to this query. If a device fails to respond, it has either failed or lost its connection to the power rail. In either case, it is unavailable for system use.

Further, for purposes of cluster communications, various system devices, in each of multiple systems, including network interface cards (NICs) and high-speed computer interfaces (HCIs) are also equipped with power communications controllers (PCC), to send and receive signals over the power mains of the installation where the systems are located. In this manner, controller 228 in the power supply of the various systems, as well as the NICs and HCIs, can communicate with those in other systems over the power mains.

For example, if one system receives information that the cluster interconnect of another system is not operating properly, it may command the cluster interconnect of that system to reset itself. Of course, this would be an authenticated command, so that the component could not be arbitrarily reset. For example, if a NIC can't communicate on the cluster, it can tell the PCC to check the current status of the other node. Assuming the node is OK, it could tell the PCC to reset the NIC. Alternatively, the entire node could be reset, although this would result in a loss of data. This should be an authenticated command to protect against the case where a non-cluster member issues a reset.

If communications over one or more of the primary networks cannot be reestablished with a node, but the node responds to queries over the power mains, then power-mains communications can be used to establish the jobs running on the "lost" system, so that they may be reassigned to other systems in the cluster.

Description of Network

As described above, the preferred embodiment provides a network of nodes, wherein each node is preferably as described above. According to the preferred embodiment, each of the nodes are linked over a common high speed network, but is also configured to communicate over a common power mains. In this way, the power mains connection itself serves as a secondary (or even tertiary) means of communications. Since the power supply of each node incorporates a microcontroller capable of communicating over power systems, each node is capable of communicating with; each other node over any common power mains. In addition, according to the preferred embodiment, the power supply microcontroller in each node can act as a bridge to allow communications over the power mains to the individual devices on each node's power rail.

It is important to note that since the individual nodes communicate over the power mains, they must of course be connected to the mains in a manner which does not filter or otherwise prevent these communications. For example, if a node is connected to the mains through an uninterruptable power supply (UPS), the UPS must not prevent communications between the node and the mains. According to an alternative embodiment, the UPS itself may incorporate a controller and act as a system node, allowing its status to be checked or changed over the mains system.

This system provides an advantage to systems in clusters or in a loosely coupled system by allowing use of the power mains as an additional command and control channel messaging mechanism, which is necessarily closely associated with the application of electrical power to any of the member nodes in the cluster. This allows further refinement of quorum validation routines in that loss of node power does not necessarily have the same symptoms to observing nodes as does loss of messaging via the primary command and control channels (the primary network).

One current methodology for quorum validation is to send messages to other nodes to obtain mutual consent on the agreed-upon list of cluster members. Loss of messaging between any nodes (or group of nodes) in a cluster is the cause for the remaining cluster nodes to attempt to obtain mutual consent on an agreed upon list of cluster members. The preferred embodiment provides a secondary command and control channel that is independent of the current network and is closely associated with the application of system power to a failed node. In general, if communications are lost over the power mains, it means that the node has been removed from the power mains and is therefore down.

The innovative power-mains secondary channel can be implemented using a variety of current protocols, including CE-Bus, X-10, LonWorks, Intelligent UPS communication protocols, and IPMI. When a member of a quorum loses connectivity, a connected member of the quorum could communicate with the disconnected member via the power mains, or with objects closely associated with the power mains.

By using the preferred power-mains secondary channel, surviving members could, for example, use the information in the following ways:

Soft power switches (i.e. the on/off generates a system management interrupt which signals the system to prepare for a power off) can be used to signal a critical time window in which other nodes attempt to re-arbitrate the quorum token object. This may or may not have operating system cooperation on the node being powered down.

If a node becomes unresponsive over the primary cluster communications channel, surviving nodes can force a power-cycle reset on the unresponsive node, by sending a "restart" command to that node's power supply.

Given the much higher fault rate of system software than hardware, a power cycle reset is a very effective strategy for restoring a node to normal operation.

Taking advantage of the fact that if a node becomes unreachable by both primary and secondary (power mains) communication channels, it has been removed from the power mains and will not be part of a rogue subcluster.

Figure 3:
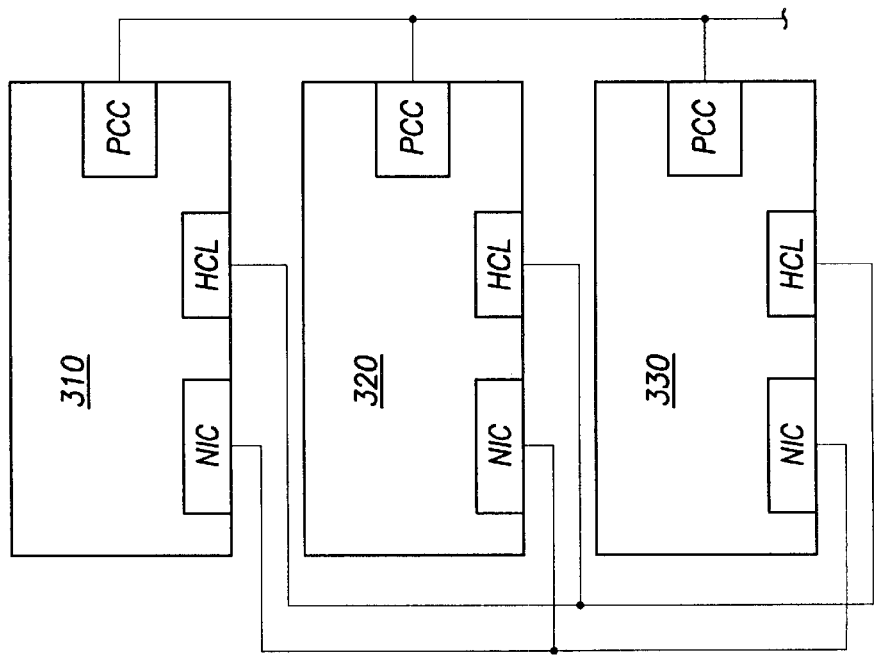
FIG. 3 shows a simple quorum layout with network and power control components.

FIG. 3 shows a simple quorum layout with network and power control components. In this figure, three systems are shown (310, 320, 330), each having a network interface card (NIC), a high-speed computer interface (HCI), and a power communications controller (PCC). In this sample embodiment, a single PCC is shown for each system, and would typically be located in the power supply, which is connected to the power mains. However, as described elsewhere, many other system components will, according to the preferred embodiment, be connected to communicate over the internal power rail. These systems primarily communicate over the network NIC and the HCI, but also use the PCC for quorum validation and communication. Using the PCC to communicate over the power bus, the systems are able to check the heartbeat of other systems. If, for example, system 310 drops communication over HCI and NIC, the other systems can query it over the PCC. Of course, although this exemplary diagram shows two high-bandwidth network connections (the NIC and HCI) in addition to the power mains, there may be only one of these, or there may be additional connections.

At this time, the other systems can determine the state of system 310, and take appropriate action. For example, it might be necessary to reset system 310 in its entirety, or to simply reset system 310's HCI. Further, communications over the PCC may be used to determine the state of jobs on system 310, in order to determine, for example, whether to immediately reset that system or to wait for a job to finish before attempting to reset 310's HCI. In all these ways, the innovative quorum communications over the power mains, using the PCC, provide distinct advantages.

Figure 4:
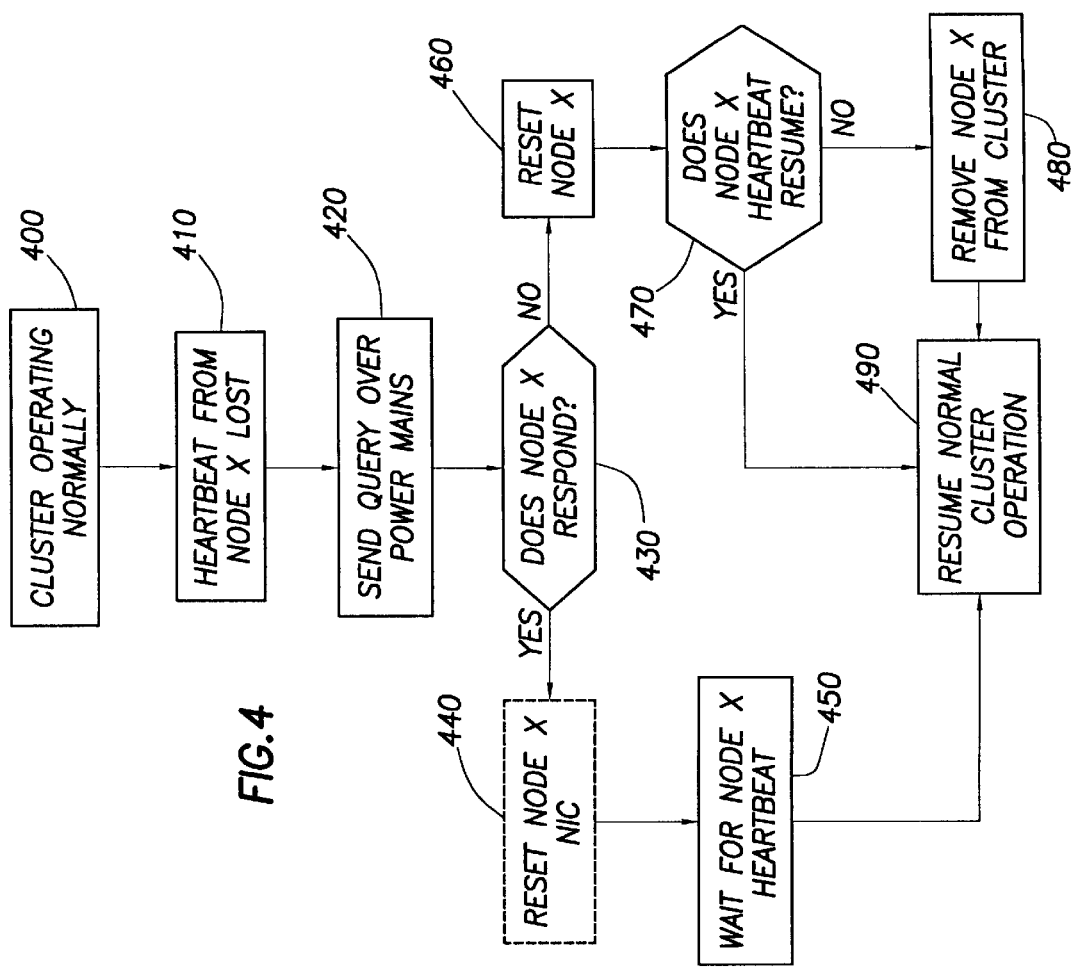
FIG. 4 shows a flowchart of cluster operation with quorum validation according to the preferred embodiment.

FIG. 4 shows a flowchart of typical cluster operation with quorum validation over the power mains. In this figure, the cluster is assumed to be initially operating normally (step 400). When the cluster loses the heartbeat from a given node X (step 410), the cluster controller will send a query to node X over the power mains via the PCC (step 420).

If node X responds (step 430), the cluster can optionally reset the NIC or HCI of node X by sending a command over the power mains, which is then passed over the power rail to the device being reset (step 440). The cluster will then continue operation while waiting for a heartbeat from node X (step 450), and will not remove node X from the cluster. When the heartbeat is restored, normal cluster operation resumes (step 490).

If node X does not respond to the query (step 430), the cluster will attempt to reset node X via the power mains. If this is successful, and a heartbeat is received from node X (step 470), normal cluster operation is resumed (step 490). If no heartbeat is received from node X (step 470), node X is removed from the cluster (step 480) and the cluster resumes normal operation without node X (step 490).

According to a disclosed class of innovative embodiments, there is provided a cluster comprising: a plurality of computer systems configured for quorum operations, each comprising at least one microprocessor, and a power supply connected to provide power to said microprocessor from a power mains connection; at least one network connecting said computer systems and allowing communication therebetween; wherein said computer systems are configured to communicate with each other both over said network, and also through said power main connections; wherein said computer systems utilize communications over said power main connections for quorum arbitrations.

According to another disclosed class of innovative embodiments, there is provided a computer supersystem, comprising: a plurality of computer systems, each having a microprocessor and memory, and a power supply connected to provide power to said microprocessor and said memory from a power main connection; a network connecting said computer systems and allowing communication therebetween; wherein said computer systems are configured to communicate with each other both over said network, and also through said power main connections; and wherein if communications over said network to a given one of said computer systems is lost, communications over said power main connections are used to verify whether said one computer system is still being powered through said power mains.

According to another disclosed class of innovative embodiments, there is provided a computer supersystem, comprising: a plurality of computer systems configured for quorum operations, each having a microprocessor which is operatively connected to detect inputs from said input device, random-access memory which is connected to be read/write accessible by said microprocessor, and a power supply connected to provide power to said microprocessor and said memory; a network connecting said computer systems and allowing communication therebetween; wherein said computer systems are connected to a common power mains system, and are capable of communicating therebetween over said power mains; and wherein said computer systems utilize communications over said power mains for quorum arbitrations; and wherein if communications are lost or suspended over said network, said computer systems utilize communications over said power mains for quorum renegotiation.

According to another disclosed class of innovative embodiments, there is provided a computer supersystem, comprising: a plurality of computer systems configured for quorum operations, each having a user input device, a microprocessor which is operatively connected to detect inputs from said input device, random-access memory which is connected to be read/write accessible by said microprocessor, an output device operatively connected to receive outputs from said microprocessor, and a power supply connected to provide power to said microprocessor and said memory, and a network communications interface for inter-system communication over a computer network; a network connecting said computer systems and allowing communication therebetween, operatively connected to each of said network communications interfaces; wherein said computer systems are connected to a common power mains system, and are capable of communicating therebetween over said power mains; and wherein if communications to a given computer system are lost or suspended over said network, one or more components of said given computer system may be reset using communications over said power mains.

According to another disclosed class of innovative embodiments, there is provided a method of verifying communications in a cluster, comprising the steps of: (a.) communicating between first and second computer systems over a primary network; (b.) if communications between said first and second computer systems over said primary network is lost, then communicating over a secondary network; (c.) if a given computer system is unavailable over said secondary network, then designating said given system as unavailable; wherein said secondary network includes communications over a power mains.

According to another disclosed class of innovative embodiments, there is provided a method of restoring communications in a cluster, comprising the steps of: (a.) communicating between first and second computer systems over a primary network; (b.) if communications between said first and second computer systems over said primary network is lost, then communicating over a secondary network; (c.) if a given computer system is unavailable over said secondary network, then resetting one or more components of said given computer system, using communication over said secondary network; wherein said secondary network includes communications over power mains.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, the IPMI interface specification is not at all necessary for use with the claimed inventions, and various non-IPMI interface specifications can also be used.

It is also possible to configure each node to regularly send an independent heartbeat signal over the power mains during normal operation. Doing so would allow other nodes to constantly detect whether the sending node is still alive, without having to specifically send a query to that system.

In another alternative embodiment, the disclosed architecture can be used to initiate a soft reset of a communication device (e.g. the HCI or NIC) at a cluster node which has fallen out of communication, without doing a complete reset on that node.

In another alternative embodiment, the disclosed architecture can be used to initiate a complete restart of a communication device (e.g. the HCI or NIC) at a cluster node which has fallen out of communication.

It should also be noted that the hub and spoke topology of FIG. 1 is not strictly necessary to use of the claimed inventions, and alternatively other topologies can be used.

While the disclosed architecture is believed to be particularly advantageous in cluster systems, it is also contemplated that the disclosed inventions can be applied to other multi-computer supersystems, even if those supersystems are not clusters properly so called.

For another example, although it would not be practical with present limitations of the bandwidth of power mains communications, it is technically possible to perform all network communications, in addition to the disclosed cluster functions, over the power mains.

What is claimed is:

1. A cluster comprising:
   a plurality of computer systems configured for quorum operations, each comprising at least one microprocessor, and a power supply connected to provide power to said microprocessor from a power mains connection;
   at least one network connecting said computer systems and allowing communication therebetween;
   wherein said computer systems are configured to communicate with each other by transmitting data both over said network, and also through said power main connections;
   wherein said computer systems utilize communications over either said power main connections and said network for quorum arbitrations regardless of the data transmission size.

2. The cluster of claim 1, wherein one of said plurality of computer systems generates said command and control signals to communicate with others of said plurality of computer systems.

3. The cluster of claim 1, wherein said computer systems can initiate a system reset in response to commands received over said power main connections without the need to reset said cluster.

4. The cluster of claim 1, wherein said computer systems can restart an interface to said network in response to commands received over said power main connections without the need to reset said cluster or said computer system entirely.

5. The cluster of claim 1, wherein said communications use a modified CEBus protocol.

6. The cluster of claim 1, wherein said computer systems also use communications over said power main connections for IPMI network management functions.

7. A computer supersystem, comprising:
   a plurality of computer systems, each having a microprocessor and memory, and a power supply connected to provide power to said microprocessor and said memory from a power main connection;
   a network connecting said computer systems and allowing communication therebetween;
   wherein said computer systems are configured to communicate with each other by transmitting data both over said network, and also through said power main connections regardless of the data transmission size;
   and wherein if communications over said network to a given one of said computer systems are lost, communications over said power main connections are used to verify whether said one computer system is still being powered through said power mains.

8. The supersystem of claim 7, wherein one of said plurality of computer systems generates said command and control signals to communicate with others of said plurality of computer systems.

9. The supersystem of claim 7, wherein said communications take place utilizing a modified CEBus protocol.

10. The supersystem of claim 7, wherein ones of said computer systems can be restarted by communications over said power main connections without the need to restart said supersystem.

11. The supersystem of claim 7, wherein ones of said computer systems each include a communication device which provides data communication through said network and which can be restarted by communications over said power main connections, without the need to restart said supersystem or said computer systems entirely.

12. A computer supersystem, comprising:
    a plurality of computer systems configured for quorum operations;
    a network connecting said computer systems and allowing communication therebetween, wherein said communications comprise transmitting data;
    wherein said computer systems utilize communications over both said power mains and said network for quorum arbitrations regardless of the data transmission size; and
    wherein if communications are lost or suspended over said network, said computer systems utilize communications over said power mains for quorum renegotiations.

13. The supersystem of claim 12, wherein one of said plurality of computer systems generates said command and control signals to communicate with others of said plurality of computer systems.

14. The supersystem of claim 12, wherein said communications take place utilizing a modified CEBus protocol.

15. The supersystem of claim 12, wherein ones of said computer systems can be restarted by communications over said power main connections, without the need to restart said supersystem entirely.

16. The supersystem of claim 12, wherein ones of said computer systems each include a communication device which provides data communication through said network and which can be restarted by communications over said power main connections, without the need to restart said supersystem or said computer system entirely.

17. The supersystem of claim 12, wherein communications over said power main connections can include all management functions defined by the IPMI specification.

18. A computer supersystem, comprising:
    a plurality of computer systems configured for quorum operations, each having a user input device, a microprocessor which is operatively connected to detect inputs from said input device, random-access memory which is connected to be read/write accessible by said microprocessor, an output device operatively connected to receive outputs from said microprocessor, and a power supply connected to provide power to said microprocessor and said memory, and a network communications interface for inter-system communication over a computer network;

a high-speed network connecting said computer systems and allowing communication therebetween, operatively connected to each of said network communications interfaces;

wherein said communication comprises transmitting data;

wherein said computer systems are connected to a common power mains system, and are capable of communicating therebetween over both said power mains and said high-speed network regardless of the data transmission size; and wherein if communications to a given computer system are lost or suspended over said network, one or more components of said given computer system may be reset using communications over said power mains, without the need to restart said computer system entirely.

19. The supersystem according to claim 18, wherein each said microprocessor is an x86 microprocessor.

20. The supersystem of claim 18, wherein communications over said network have a maximum data rate which is more than 1000 times greater than the maximum data rate of said communications over power mains.

21. The supersystem of claim 18, wherein if communications to said given computer system over said network cannot be restored, then the jobs running on said given computer system are determined by communications over said power mains, and said jobs are reassigned to another computer system.

22. A method of verifying communications in a cluster, comprising the steps of:

(a.) communicating between first and second computer systems over a primary network;

(b.) if communications between said first and second computer systems over said primary network is lost, then communicating over a secondary network;

(c.) if a given computer system is unavailable over said secondary network, then designating said given system as unavailable;

wherein said communications comprise transmitting data;

wherein said secondary network includes communications over a power mains and said communications occur regardless of the data transmission size.

23. The method of claim 22, wherein said communications over said secondary network use a modified CEBus protocol.

24. The method of claim 22, wherein ones of said computer systems can be restarted by communications over said secondary network, without the need to restart any other of said computer systems in said cluster.

25. The method of claim 22, wherein ones of said computer systems each include a communication device which provides data communication through said primary network and which can be restarted by communications over said secondary network, without the need to restart either of said computer systems.

26. The method of claim 22, wherein communications over said primary network have a maximum data rate which is more than 1000 times greater than the maximum data rate of said secondary network.

27. A method of restoring communications in a cluster, comprising the steps of:

(a.) communicating between first and second computer systems over a primary network;

(b.) if communications between said first and second computer systems over said primary network is lost, then communicating over a secondary network;

(c.) if a given computer system is unavailable over said secondary network, then resetting one or more components of said given computer system, using communication over said secondary network, without the need to reset said cluster or said computer system entirely;

wherein said communications comprise transmitting data;

wherein said secondary network includes communications over power mains and said communications occur regardless of the data transmission size.

28. The method of claim 27, wherein each said computer system includes only one CPU.

29. The method of claim 27, wherein said communications over said secondary network use a modified CEBus protocol.

30. The method of claim 27, wherein ones of said computer systems can be restarted by communications over said secondary network, without the need to restart said cluster entirely.

31. The method of claim 27, wherein ones of said computer systems each include a communication device which provides data communication through said primary network and which can be restarted by communications over said secondary network.

32. The method of claim 27, wherein communications over said primary network have a maximum data rate which is more than 1000 times greater than the maximum data rate of said secondary network.

* * * * *